Patented Dec. 3, 1929

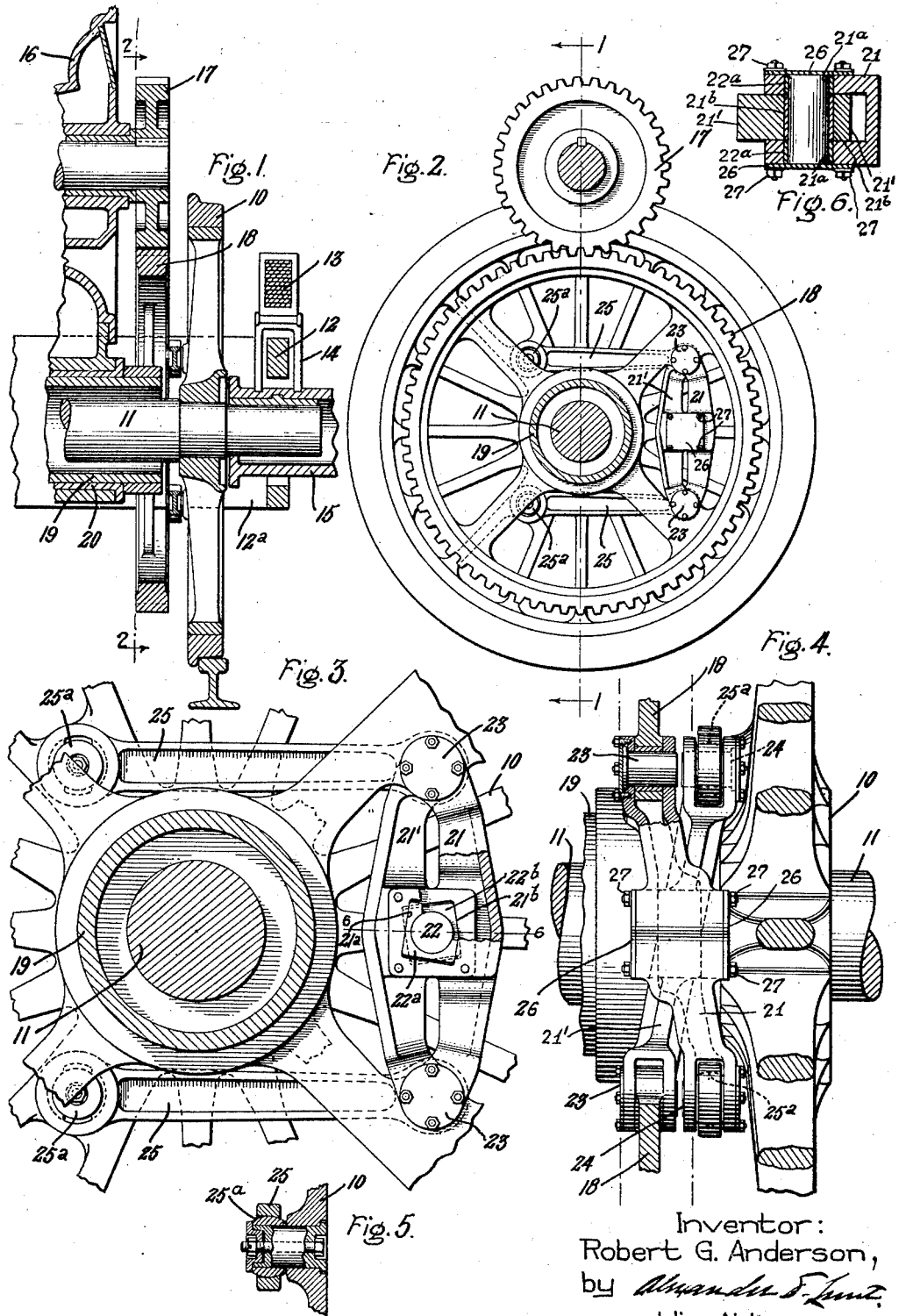

1,738,416

UNITED STATES PATENT OFFICE

ROBERT G. ANDERSON, OF ERIE, PENNSYLVANIA, ASSIGNOR TO GENERAL ELECTRIC COMPANY, A CORPORATION OF NEW YORK

FLEXIBLE COUPLING

Application filed December 23, 1927. Serial No. 242,215.

My invention relates to flexible couplings and has for its object to provide an improved and simplified coupling of rugged construction which will transmit torque from one rotatable element to another and at the same time permit universal relative movement between the elements. I accomplish this by connecting the rotatable elements by means of a coupling comprising two members pivotally connected together intermediate the ends thereof, and connecting one end of each of said members to one of said elements and the other end of each of said members to the other of said elements.

My invention will be more fully set forth in the following description referring to the accompanying drawing and the features of novelty which characterize my invention will be pointed out with particularity in the claims annexed to and forming a part of this specification.

In the drawing Fig. 1 is a fragmentary section of a locomotive or car embodying my invention taken on the line 1—1 of Fig. 2; Fig. 2 is a sectional view taken on the line 2—2 of Fig. 1; Fig. 3 is an enlarged view of a portion of Fig. 2 showing the relation of the coupling to the driving wheel and driving gear of the locomotive; Fig. 4 is a side elevation of the structure shown in Fig. 3 partly broken away; Fig. 5 is a sectional view of the universal joint connection between the links of the coupling and the driving wheel of the locomotive or car, and Fig. 6 is a sectional view on the line 6—6 of Fig. 3.

Referring to the drawing, the locomotive or car in connection with which I have illustrated my invention comprises a driving wheel 10 mounted in the usual manner on an axle 11, and a side frame 12 which is suported on the axle by springs 13 connected to the main frame on each side of a saddle 14, which supports the springs on journal boxes 15. The locomotive is driven by any suitable means such as an electric motor 16 provided with a pinion 17 engaging a driving gear 18. The driving gear is mounted on a hollow quill shaft 19 surrounding the axle 11 and carried by bearings 20 extending from the motor frame. This constitutes a unitary structure in which the driving gear and the pinion are maintained in alignment during operation of the locomotive or car. In order to minimize the dead weight carried on the axle 11 the motor and driving gear are supported on the side frame 12 by cross ties 12$^a$.

It is apparent that in rounding curves or passing over irregularities in the track the frame of the locomotive or car will tilt and move up and down on the springs which will cause tilting and vertical displacement of the axle 11 relative to the driving gear 18. For this reason it is necessary to provide a flexible connection between the rotatable elements comprising the driving gear 18 and the driving wheels which will permit the frame to move freely on the spring suspension system. This is done in accordance with my invention by pivotally connecting together two members 21 and 21' intermediate the ends thereof at 22, one end of each of the members being pivotally connected to the driving gear by pivotal support 23 fixed thereto, and the other end of each of the members being connected to the driving wheel 10 by a pivotal support 24 movable relative thereto. In order to arrange the ends of the members adjacent the elements to which they are connected and simplify the construction of the coupling, the members 21 and 21' are preferably crossed and pivotally connected together at 22. It will be observed that if the three pivotal supports 22, 23 and 24 were fixed relative to the members 21 and 21' that the coupling would be rigid, but this is avoided by securing the pivotal support 22 in sliding blocks 22$^a$ and 22$^b$ arranged in guideways 21$^a$ and 21$^b$ formed in the members. As shown in Fig. 6, the member 21 is of U-shaped cross-section and is formed with axially extending guideways 21$^a$ in each side thereof, in which are arranged sliding blocks 22$^a$ fitted on a pivot pin 22. The mid-portion of the member 21' extends between the sides of the member 21 and is provided with an axially extending guideway 21$^b$ in which a sliding block 22$^b$ is arranged. The sliding block 22$^b$ is loosely arranged between the sliding blocks 22$^a$ and is also fitted on the pivot pin 22. The pivot pin 22 and the sliding blocks $22^a$ and $22^b$ are retained in place by cover plates 26 which are bolted to the sides of the member 21 at 27. By this construction a sliding pivotal connection is provided between the members 21 and 21'. Although this manner of movably supporting the members is simple and easily constructed any other suitable connection may be used at any one of these pivotal connections instead of that shown. In some instances it is necessary merely to fit pivotal connection 22 loosely in the members 21 and 21' as the relative movement of the members upon displacement of the axes of the gear and wheel may be quite small. I prefer to movably connect the pivotal support 24 to the driving wheel by substantially parallel links 25 which are connected to the pivotal support and the driving wheel by ball and socket joints $25^a$ similar to that shown in Fig. 5, one of each of the links 25 being carried by one of the pivotal supports 24. It is desirable that the coupling should be proportioned so that the angular velocity ratio between the driving wheel and the gear should remain substantially constant and in order to make the variation between them negligible the links 25 are made of such length that where the axes of the driving wheel and the gear coincide the axes of the pivotal connections 23 and 24 are in axial alignment. This forms a substantially parallel four bar linkage in which the links 25 form two swinging links, and the members 21, 21' and portions of the wheel supporting the pivotal connections $25^a$ on the driving wheel form the other two links. As a result when the axes of the gear and driving wheels are vertically displaced there is substantially no angular movement between them because the line of centers of the pivotal supports $25^a$ remains substantially parallel to the members 21 and 21'. The angular velocity ratio between the gear and the wheel is not maintained exactly constant because the spring suspension system substantially restricts the relative movement between the driving gear and the driving wheel to the vertical. Consequently, the pivotal connections 23 and 24 are slightly displaced from axial alignment when the axes of the wheel and gear are moved out of axial alignment, the sliding blocks $22^a$ and $22^b$ moving slightly in the guideways $21^a$ and $21^b$ in the members 21 and 21'. However, the links 25 are made long enough so that throughout the range of displacement of the axes of the driving gear and driving wheel the variation in angular velocity between them is practically negligible.

In the operation of the locomotive or car, the unitary structure comprising the motor 16 and the driving gear 18 moves up and down vertically and tilts laterally on the spring suspension system. When the driving gear and driving wheel are in the position shown in the drawing the vertical movement of the driving gear causes the links 25 to swing about the ball and socket joints $25^a$, and the members 21 and 21' to turn slightly on the pivotal connection 22, at the same time moving the sliding blocks $22^a$ and $22^b$ slightly in the guideways $21^a$ and $21^b$. If the driving gear and wheel are rotated to a position at right angles to that shown in the drawing vertical movement of the gear relative to the wheel swings the members 21 and 21' about the pivotal connections 22, 23 and 24 and slides the blocks $22^a$ and $22^b$ in the guideways $21^a$ and $21^b$, at the same time swinging the links 25 on the ball and socket joints $25^a$ to compensate for the change in distance between the pivotal connections 24. It will thus be seen that the driving gear is flexibly connected to the driving wheel and is movable along all radii thereof, the movement along radii other than those at right angles described causing slightly modified movement in the parts of the coupling. Transverse tilting of the driving gear relative to the driving wheel in any position is not restricted as the links 25 are free to tilt transversely on the ball and socket joints $25^a$.

Torque is transmitted clockwise as viewed in Figs. 2 and 3 of the drawing by tension in the upper link 25 which tends to move the outer member 21 inwardly. The outer member 21 is restrained by the pivotal connection 22 which subjects both of the members 21 and 21' to a bending stress and the lower member 25 to compression. In all positions of the links 25 the forces thereon act along their longitudinal axes so that the torque transmitted does not tend to change the position of the driving gear relative to the driving wheel. It is apparent that in transmitting torque counterclockwise as viewed in Figs. 2 and 3 that the upper link 25 will be subjected to compression and the lower link 25 to tension, the members 21 and 21' at the same time being subjected to a bending stress opposite to that to which they are subjected in transmitting torque clockwise.

I have illustrated my improved coupling in connection with a locomotive or car, but it is apparent that it may be used in any device where a flexible coupling is desirable. Moreover, modifications of the form of my invention which I have illustrated and described will occur to those skilled in the art, and I desire it to be understood, therefore, that my invention is not to be limited to the particular arrangement disclosed except as defined in the appended claims.

What I claim as new and desire to secure by Letters Patent of the United States is:—

1. In combination with two rotatable elements, a flexible coupling comprising two members pivotally connected together intermediate the ends thereof and arranged with their ends on opposite sides of each other, and means for flexibly connecting said members to said rotatable elements.

2. In combination with two rotatable elements, a flexible coupling comprising two members pivotally connected together intermediate the ends thereof and arranged with their ends on opposite sides of each other, and means for connecting one end of each of said members to one of said elements and the other end of each of said members to the other of said elements.

3. In combination with two rotatable elements, a flexible coupling comprising two members pivotally connected together intermediate the ends thereof and arranged with their ends on opposite sides of each other, the ends of said members having separate pivotal connections arranged substantially in axial alinement with each other.

4. In combination with two rotatable elements, a flexible coupling comprising two members, means for pivotally connecting said members together intermediate the ends thereof, said means being movable axially of said members, and means for pivotally connecting said members at one end to one of said elements and at the other end to the other of said elements.

5. In combination with two rotatable elements, a flexible coupling comprising two members, means including a sliding pivotal connection for securing said members together intermediate the ends thereof, means including pivotal supports fixed on one of said elements for connecting one end of each of said members thereto, and means including a pivotal support movably secured to the other of said elements for connecting the other end of each of said members thereto.

6. In combination with two rotatable elements, a flexible coupling comprising two members, means including a slidable pivotal connection for securing said members together intermediate the ends thereof, means including pivotal supports fixed on one of said elements for connecting one end of each of said members thereto, and means including links for pivotally connecting the other end of each of said members to the other of said elements.

7. In combination with two rotatable elements, a flexible coupling comprising two members, means including a slidable pivotal connection for securing said members together intermediate the ends thereof, means including pivotal supports fixed on one of said elements for connecting one end of each of said members thereto, and means including links for pivotally connecting the other end of each of said members to the other of said elements, each of said links including a universal joint connection between said other element and one of said members respectively.

8. In combination with two rotatable elements, a flexible coupling comprising two members, means for pivotally connecting said members together intermediate the ends thereof, and means for pivotally connecting one of the adjacent ends of said members to one of said elements and the other of the adjacent ends of said members to the other of said elements, said connecting means being proportioned and arranged to maintain the ends of said members substantially in transverse alignment when the axes of said elements are in axial alignment.

9. In combination with two rotatable elements, a flexible coupling comprising two crossed members arranged with the ends of one adjacent the ends of the other, means including a slidable pivotal connection for securing said members together intermediate the opposite ends thereof, means including a pivotal support fixed on one of said elements for connecting one of the adjacent ends of said members thereto, and means including links proportioned and arranged to maintain the adjacent ends of said members in substantial transverse alignment when said elements are in axial alignment for connecting the other of the adjacent ends of said members to the other of said elements.

10. In a locomotive or car having an axle with wheels thereon, a frame spring borne on said axle, driving means for said wheels including a driving gear carried by said frame, and means including two members pivotally connected together intermediate the ends thereof for transmitting torque from said driving gear to said wheels, said members being arranged between said driving gear and one of said wheels and being axially movable with respect to the pivotal connection between them.

11. In a locomotive or car having an axle with wheels thereon, a frame spring borne on said axle, driving means for said wheels including a driving gear carried by said frame, means for transmitting torque from said driving gear to said wheels comprising a flexible coupling having two members pivotally connected together intermediate the ends thereof, pivotal supports fixed on said driving gear for connecting one end of each of said members thereto, and movable pivotal supports carried by said driving wheel for connecting the other end of each of said members thereto.

12. In a locomotive or car having an axle with wheels thereon, a frame spring borne on said axle, driving means for said wheels including a driving gear carried by said frame, and means for transmitting torque from said driving gear to said wheels comprising a flexible coupling having two members pivotally connected together intermediate the ends thereof, pivotal supports fixed on said driving gear for connecting one end of each of said members thereto, and movable pivotal supports connected by links to said driving wheel connecting the other end of each of said members thereto.

13. In a locomotive or car having an axle with wheels thereon, a frame spring borne on said axle, driving means for said wheel including a driving gear carried by said frame, and means for transmitting torque from said driving gear to said wheels comprising a flexible coupling having two crossed members pivotally connected together intermediate the ends thereof, pivotal supports fixed on said driving gear for connecting one end of each of said members thereto, and movable pivotal supports connected by substantially parallel links to said driving wheel connecting the other end of each of said members thereto, said links being proportioned and arranged to maintain the ends of one of said members in substantial transverse alignment with the ends of the other.

In witness whereof, I have hereunto set my hand this 22nd day of December, 1927.

ROBERT G. ANDERSON.